(12) United States Patent
Shin et al.

(10) Patent No.: US 7,599,004 B2
(45) Date of Patent: Oct. 6, 2009

(54) DIGITAL VIDEO SIGNAL PROCESSING APPARATUS AND METHOD FOR EXTRACTING DATA IN A VERTICAL BLANKING INTERVAL

(75) Inventors: Dong-suk Shin, Suwon-si (KR); Hyung-jun Lim, Suwon-si (KR); Jae-hong Park, Seongnam-si (KR); Kyoung-mook Lim, Hwaseong-si (KR); Heo-jin Byeon, Hwaseong-si (KR); Sung-cheol Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 805 days.

(21) Appl. No.: 11/331,354

(22) Filed: Jan. 13, 2006

(65) Prior Publication Data

US 2006/0176395 A1 Aug. 10, 2006

(30) Foreign Application Priority Data

Jan. 17, 2005 (KR) .................. 10-2005-0004138

(51) Int. Cl.
*H04N 7/00* (2006.01)

(52) U.S. Cl. .................. 348/478; 348/465; 348/468; 348/572; 348/634

(58) Field of Classification Search .................. 348/465, 348/468, 478, 505, 563, 573, 634
See application file for complete search history.

(56) References Cited

U.S. PATENT DOCUMENTS

| | | | |
|---|---|---|---|
| 4,673,979 A | | 6/1987 | Kobo et al. |
| 5,506,626 A | * | 4/1996 | Yagi et al. .................. 348/464 |
| 5,517,249 A | | 5/1996 | Rodriguez-Cavazos |
| 5,812,207 A | * | 9/1998 | Cahill, III .................. 348/465 |
| 6,287,733 B1 | * | 9/2001 | Miyazaki et al. .................. 430/7 |
| 6,351,289 B1 | | 2/2002 | Chen et al. |
| 6,381,287 B1 | * | 4/2002 | Shin .................. 375/316 |
| 6,462,782 B1 | * | 10/2002 | Honda et al. .................. 348/465 |
| 6,839,091 B1 | * | 1/2005 | Hebbalalu et al. .................. 348/465 |
| 6,909,467 B2 | * | 6/2005 | Kuzumoto et al. .................. 348/468 |
| 7,046,298 B2 | * | 5/2006 | Kuzumoto et al. .................. 348/465 |
| 7,098,960 B2 | * | 8/2006 | Suzuki et al. .................. 348/465 |
| 7,110,041 B2 | * | 9/2006 | Matsumoto .................. 348/468 |
| 7,317,489 B2 | * | 1/2008 | Thaly et al. .................. 348/465 |
| 7,463,308 B2 | * | 12/2008 | Yamasaki et al. .................. 348/465 |
| 2002/0008776 A1 | * | 1/2002 | Kuzumoto et al. .................. 348/468 |
| 2003/0179316 A1 | * | 9/2003 | Morooka .................. 348/468 |

(Continued)

*Primary Examiner*—Brian P Yenke
(74) *Attorney, Agent, or Firm*—Lee & Morse P.C.

(57) ABSTRACT

A digital video signal processing apparatus and method for detecting data in a vertical blanking interval (VBI) includes a re-sampler generating, from input video data, first re-sample data at a VBI data rate and second re-sample data with a data rate twice as high as the VBI data rate, a signal tracking unit tracking an existence of a clock run-in and a phase of the clock run-in from the second re-sample data and calculating an average of the clock run-in, and a slicer determining a logical value of the first re-sample data according to the average of the clock run-in and outputting the determined logical value as VBI data, wherein the re-sampler determines a compensation phase from the tracked phase of the clock run-in, re-samples the input video data according to the compensation phase with the VBI data rate and generates the first re-sample data.

20 Claims, 9 Drawing Sheets

U.S. PATENT DOCUMENTS

2004/0041944 A1* 3/2004 Matsumoto ................. 348/465
2005/0195326 A1* 9/2005 Kudou ........................ 348/465
2006/0268170 A1* 11/2006 Suzuki et al. ............... 348/465

* cited by examiner

DIGITAL VIDEO SIGNAL PROCESSING APPARATUS AND METHOD FOR EXTRACTING DATA IN A VERTICAL BLANKING INTERVAL

BACKGROUND OF THE INVENTION

1. Field of the Invention

The present invention relates to a digital video signal processing apparatus. More particularly, the present invention relates to an apparatus for detecting teletext information or video program system (VPS) information in a vertical blanking interval (VBI) in a color television broadcasting system such as a national television system committee (NTSC) system or a phase alternation by line (PAL) system and a method using the apparatus.

2. Description of the Related Art

FIG. 1 illustrates a waveform diagram of a frame of a video signal including a vertical blanking interval (VBI) signal. The frame of the video signal used in a national television system committee (NTSC) system or a phase alternation by line (PAL) system consists of two fields, i.e., an odd field and an even field. The frame has 625/PAL or 525/NTSC horizontal scan lines and a VBI between the two fields.

Teletext information or video program system (VPS) information may be included in the VBI signal. The teletext information is used to display text information in addition to an image on a screen. The VPS information is used to identify a TV program and for recording of the TV program at an airtime that is not a scheduled time.

FIG. 2 illustrates a waveform diagram of the VBI signal. Referring to FIG. 2, the teletext information or the VPS information is included in a plurality of VBI signals in several horizontal scan periods separated by a synchronization level and a color burst. The VBI signal may include a color burst, a clock run-in, a framing code and VBI data. The color burst is a quadrature amplitude modulated signal using a predetermined subcarrier frequency for determining a color component phase. The clock run-in is a 2-byte data signal identifying the existence of teletext information or VPS information. The framing code is a 1-byte data signal for providing a standard necessary for recognition of several teletext type (TTX) systems. VBI data used for transmission/reception of the VBI signal includes actual teletext information or VPS information.

A conventional apparatus for detecting teletext information uses a phase-locked loop (PLL). Thus, a high performance PLL is necessary for detecting teletext information. Thus, the manufacturing cost of the conventional apparatus is high.

SUMMARY OF THE INVENTION

The present invention is therefore directed to a digital signal processing apparatus and method, which substantially overcome one or more of the problems due to the limitations and disadvantages of the related art.

It is a feature of an embodiment of the present invention to provide a digital video signal processing apparatus for extracting VBI data.

It is another feature of an embodiment of the present invention to provide a digital video signal processing method for extracting VBI data.

It is yet another feature of an embodiment of the present invention to extract VBI data without the use of a phase locked loop.

At least one of the above and other features of the present invention may be provided by a digital video signal processing apparatus including a re-sampler generating first re-sample data at a vertical blanking interval (VBI) data rate from input video data and second re-sample data with a data rate two times higher than the VBI data rate from input video data, a signal tracking unit tracking an existence of a clock run-in and a phase of the clock run-in and calculating an average of the clock run-in from the second re-sample data, and a slicer determining a logical value of the first re-sample data according to the average of the clock run-in and outputting the determined logical value as VBI data, wherein the re-sampler determines a compensation phase from the tracked phase of the clock run-in, re-samples the input video data according to the compensation phase with the VBI data rate, and generates the first re-sample data. The signal tracking unit may track the phase of the clock run-in by replacing the input video data with sample values in a waveform of a trigonometric function.

At least one of the above and other features of the present invention may be provided by a digital video signal processing method including generating re-sample data with a data rate two times higher than a VBI data rate from input video data, tracking a phase of a clock run-in from the generated re-sample data, calculating an average of the clock run-in from the generated re-sample data, generating re-sample data with the VBI data rate from the input video data according to a compensation phase determined by the tracked phase of the clock run-in and determining a logical value of the re-sample data with the VBI data rate according to the average of the clock run-in and outputting the determined logical value as VBI data.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
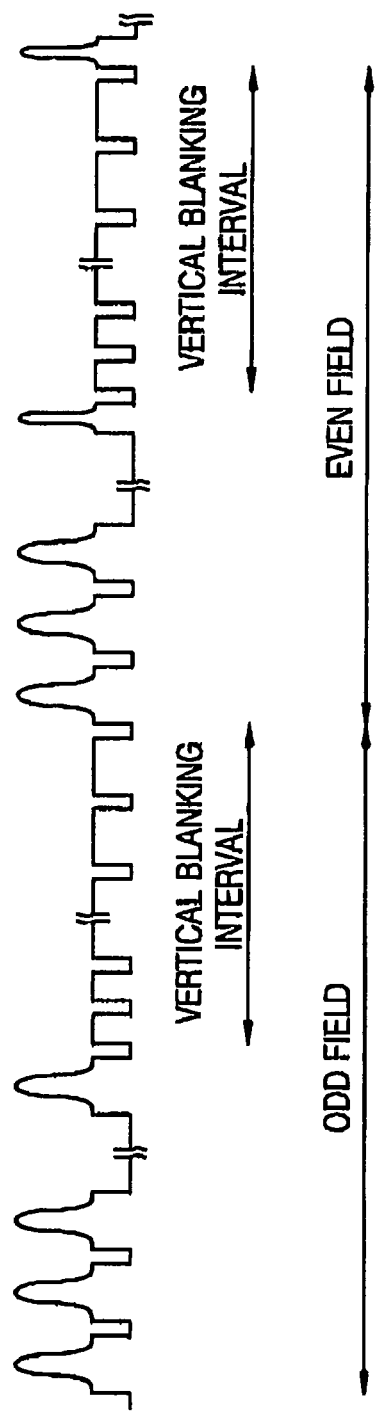
FIG. 1 illustrates a waveform diagram of a frame of a video signal including a vertical blanking interval (VBI) signal.

Korean Patent Application No. 10-2005-0004138, filed on Jan. 17, 2005, in the Korean Intellectual Property Office, and entitled: "Digital Vide Signal Processing Apparatus and Method for Extracting Data Within Vertical Blanking Interval," is incorporated by reference herein in its entirety.

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art. Like reference numerals in the drawings denote like elements throughout the drawings.

Figure 3:
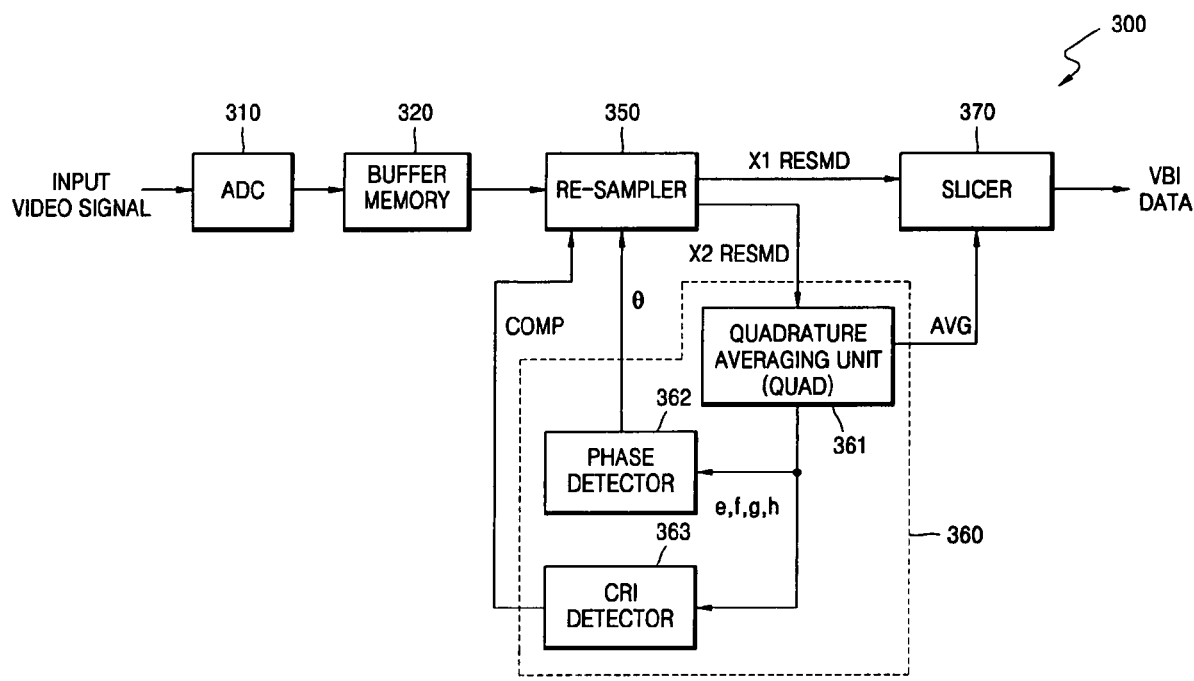
FIG. 3 illustrates a block diagram of a digital video signal processing apparatus according to an embodiment of the present invention.

FIG. 3 illustrates a block diagram of a digital video signal processing apparatus 300 according to an embodiment of the present invention.

Referring to FIG. 3, the digital video signal processing apparatus 300 may include an analog-to-digital converter (ADC) 310, a buffer memory 320, a re-sampler 350, a signal tracking unit 360 and a slicer 370. The signal tracking unit 360 may include a quadrature averaging unit (QUAD) 361, a phase detector 362 and a clock run-in (CRI) detector 363.

The ADC 310 may sample an input analog video signal at a predetermined sampling frequency fsc, convert the sampled signal into a digital signal and output digital video data. The buffer memory 320, the re-sampler 350, the signal tracking unit 360 and the slicer 370 may operate at a different frequency from that of the sample clock signal of the ADC 310.

The input analog video signal received by the ADC 310 may be used in a color television broadcasting system such as a national television system committee (NTSC) system or a phase alternation by line (PAL) system. The digital video signal processing apparatus 300 may detect teletext information or video program system (VPS) information in a vertical blanking interval (VBI) of the video signal.

The buffer memory 320 may receive the digital video data from the ADC 310, store a plurality of consecutive sample values and output video data used for a poly-phase filtering performed by the re-sampler 350. The re-sampler 350 may generate re-sample data X1RESMD with a VBI data rate and re-sample data X2RESMD with a data rate two times higher than the VBI data rate from the input digital data in the buffer memory 320.

The signal tracking unit 360 may track the existence and phase θ of the clock run-in from the re-sample data X2RESMD and calculate an average value AVG of the clock run-in. The re-sampler 350 may determine a compensation phase from the tracked phase θ of the clock run-in and generate the re-sample data X1RESMD with the VBI data rate from the input video data in the buffer memory 320 according to the determined compensation phase. The slicer 370 determines a logical value of the re-sample data X1RESMD according to the calculated average value AVG of the clock run-in and outputs the determined logical value as VBI data.

The re-sampler 350 will be described in detail later with reference to FIG. 14. The signal tracking unit 360 will be described in detail later with reference to FIG. 10. Initially, the general operation of the digital signal processing apparatus 300 will be described.

Figure 4:
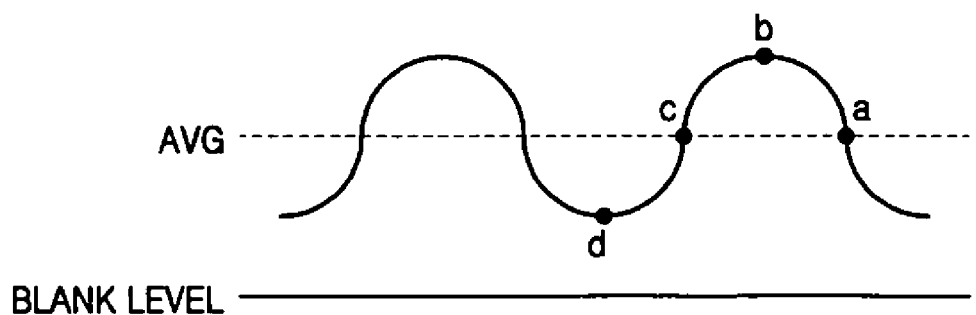
FIG. 4 illustrates the relationship between a blank level and average values of a clock run-in in a trigonometric function waveform.

FIG. 4 illustrates the relationship between a blank level and average values of a clock run-in in a waveform of a trigonometric function. Referring to FIG. 4, to track the clock run-in in the VBI, the signal tracking unit 360 may replace the re-sample data X2RESMD with sample values in the waveform of the trigonometric function, e.g., a sine or cosine function, to calculate the average values AVG of the clock run-in and determine the phase θ of the clock run-in. The re-sample data X2RESMD may be a, b, c, and d, i.e., sample values with the data rate two times higher than the VBI data rate. The re-sample data X1RESMD may be b and d, i.e., sample values with the VBI data rate.

Figure 5:
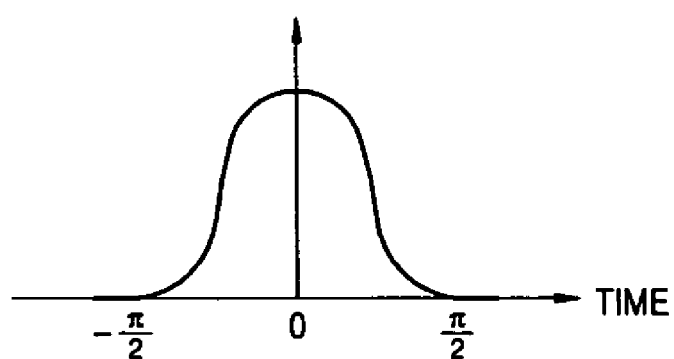
FIG. 5 illustrates a cosine waveform.
Figure 6:
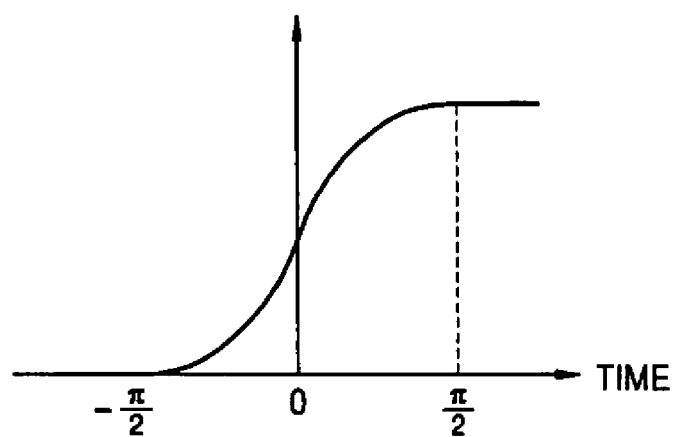
FIG. 6 illustrates a raised cosine waveform used for a transmission/ reception filter.

FIG. 5 illustrates a cosine waveform and FIG. 6 illustrates a raised cosine waveform that may be used for a transmission/reception filter. Referring to FIGS. 5 and 6, a broadcasting signal received by a modulator or a demodulator may be filtered to have the raised cosine waveform that integrates the cosine waveform. A value of the raised cosine waveform may be given by:

$$\int \cos^2 x\, dx = \int (0.5 + 0.5 \cos 2x)\, dx = 0.5 + 0.25 \sin 2x \quad (1)$$

where x is a sample location. Therefore, when the signal tracking unit 360 replaces the video data with values of a sine function, an absolute error value is below 0.2146 when $-\pi/2 \leq x \leq \pi/2$ given by, $$-0.2146 \leq 0.5x + 0.25 \sin 2x - \sin x \leq 0.2146 \quad (2)$$

Figure 7:
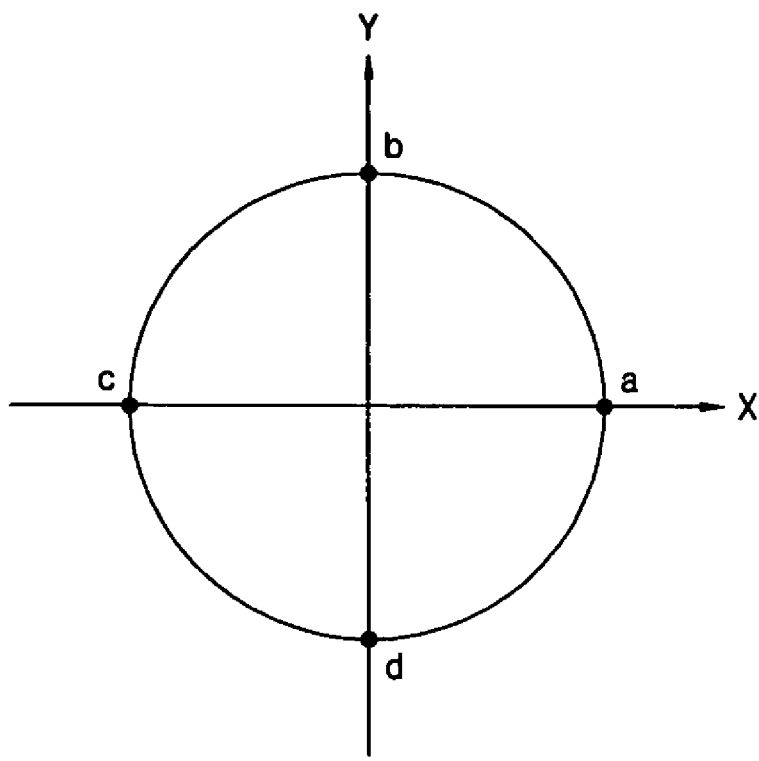
FIG. 7 illustrates coordinates on a circle indicating sample values of video data.

FIG. 7 illustrates coordinates on a circle indicating the sample values of video data. Referring to FIG. 7, the sample values a, b, c and d shown in FIG. 4 can be indicated on the circle since $$\cos^2 x + \sin^2 x = 1 \quad (3)$$

If X=sin x and Y=cos x, the sample values a, b, c, and d may be indicated as the X values and Y values. An error of the signal tracking unit 360 that uses Equation 3 to indicate the sample values of the video data is below $2*0.2146^2 = 0.092$.

Figure 8:
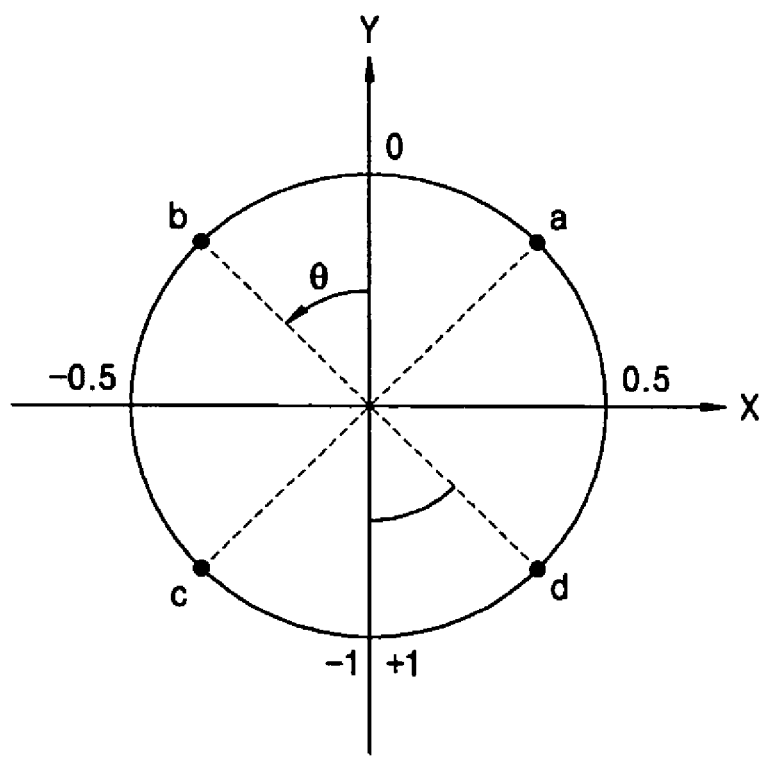
FIG. 8 illustrates phase compensation values when the clock run-in is sampled at the left of the reference coordinates shown in FIG. 7.

FIG. 8 illustrates phase compensation values when the clock run-in is sampled to the left of the reference coordinates shown in FIG. 7.

Referring to FIG. 8, when the sample values a, b, c, and d are sampled by the phase θ to the left of the reference coordinates, which have no phase error, shown in FIG. 7, an X value that normalizes the sample value b using the sine function is smaller than the reference coordinate. In the same manner, X values that normalize the sample values a, c and d using the sine function are greater, smaller and greater than the reference coordinates, respectively.

Figure 9:
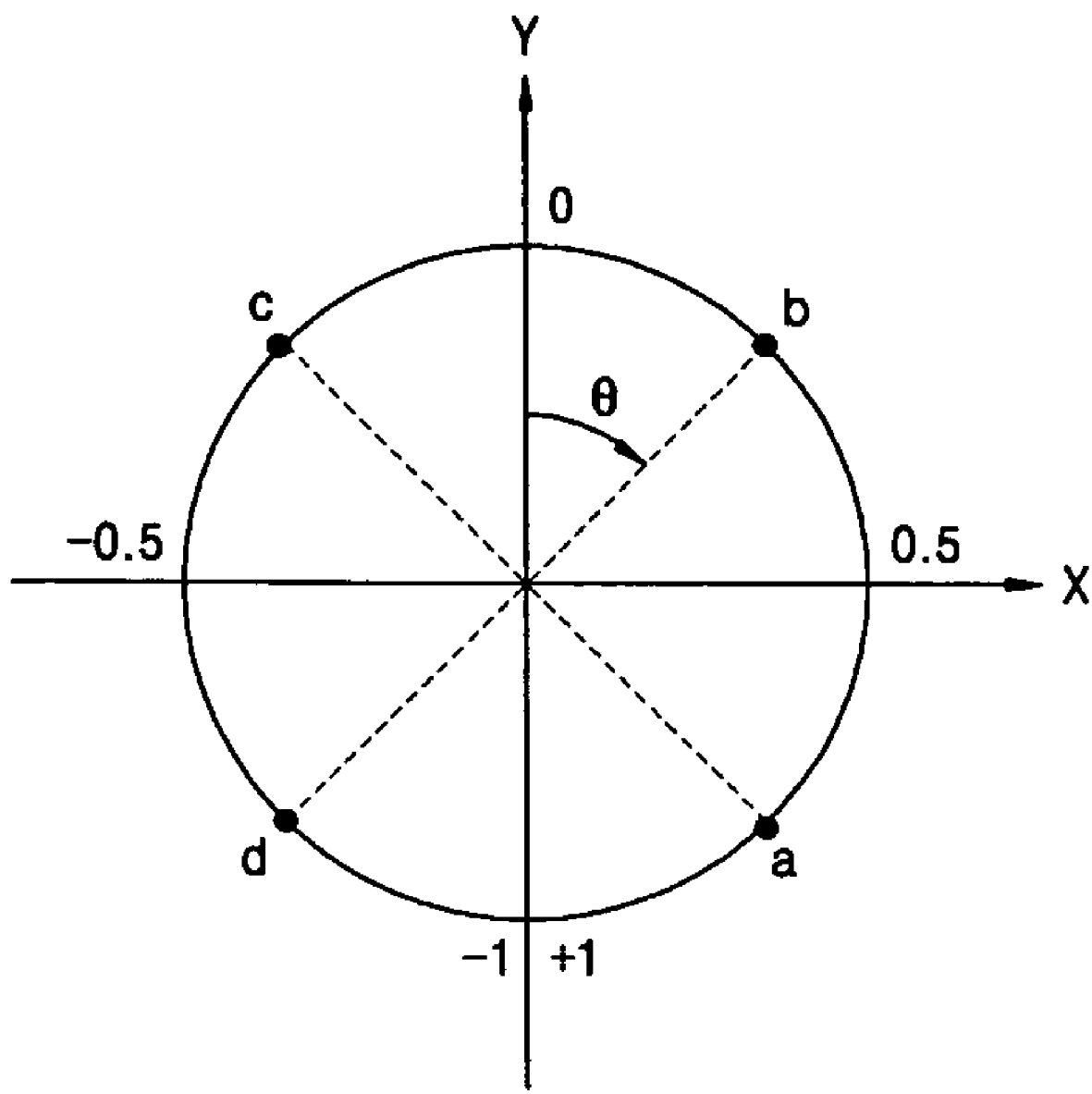
FIG. 9 illustrates phase compensation values when the clock run-in is sampled at the right of the reference coordinates shown in FIG. 7.

FIG. 9 illustrates phase compensation values when the clock run-in is sampled at the right of the reference coordinates shown in FIG. 7. Referring to FIG. 9, when the sample values a, b, c, and d are sampled by the phase θ at the right of the reference coordinates shown in FIG. 7, an X value that normalizes the sample value b using the sine function is smaller than the reference coordinate. In the same manner, X values that normalize the sample values a, c and d using the sine function are smaller, greater and greater than the reference coordinates, respectively.

The values of the axes 0, 0.5, −0.5, +1, −1 shown in FIGS. 8 and 9 indicate the phase θ of the clock run-in on the basis of the sample value b, i.e., right and left phase errors of the sample value b. These values 0, 0.5, −0.5, +1, −1 normalize each of phases 0, π/2, −π/2, +π, −π of the sample value b. The sample value b has phase errors between −π to +π relative to a reference value 0. The phase θ of the clock run-in is between 0 and −0.5 in FIG. 8 and between 0 and +0.5 in FIG. 9.

A process of determining the existence of the clock run-in from the re-sample data X2RESMD by the signal tracking unit 360 and a process of re-sampling the input video data from the buffer memory 320 according to the determined compensation phase from the phase of the clock run-in tracked by the signal tracking unit 360 by the re-sampler 350 will now be described in detail.

Figure 10:
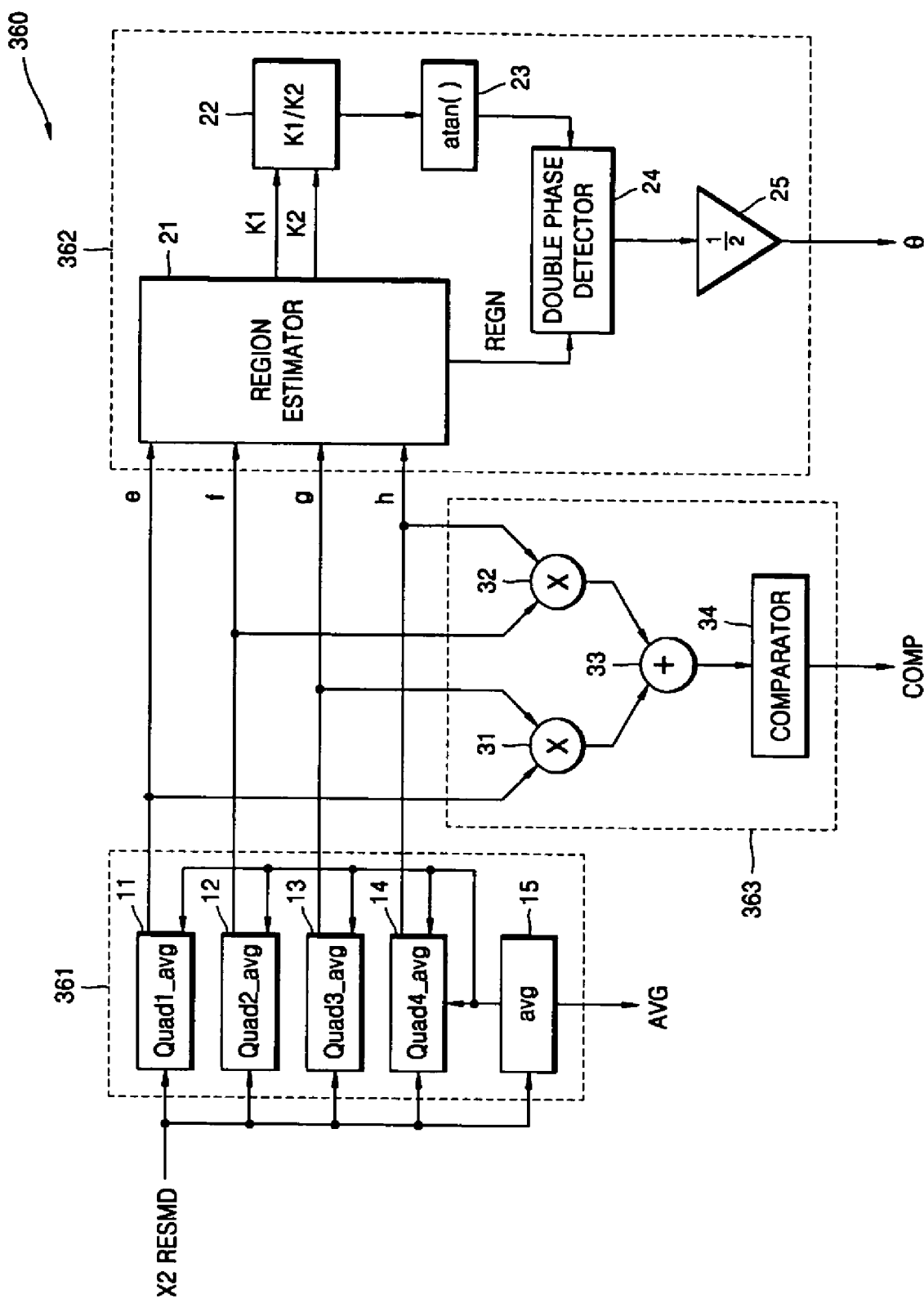
FIG. 10 illustrates a block diagram of an embodiment of the signal tracking unit shown in FIG. 3.

FIG. 10 illustrates a block diagram of an embodiment of the signal tracking unit 360 shown in FIG. 3. The quadrature averaging unit 361 may include an average calculator 15 and four output units 11~14. The phase detector 362 may include a region estimator 21, a first divider 22, a phase calculator 23, a double phase detector 24 and a second divider 25.

The clock run-in detector 363 may include a first multiplier 31, a second multiplier 32, an adder 33 and a comparator 34.

Figure 2:
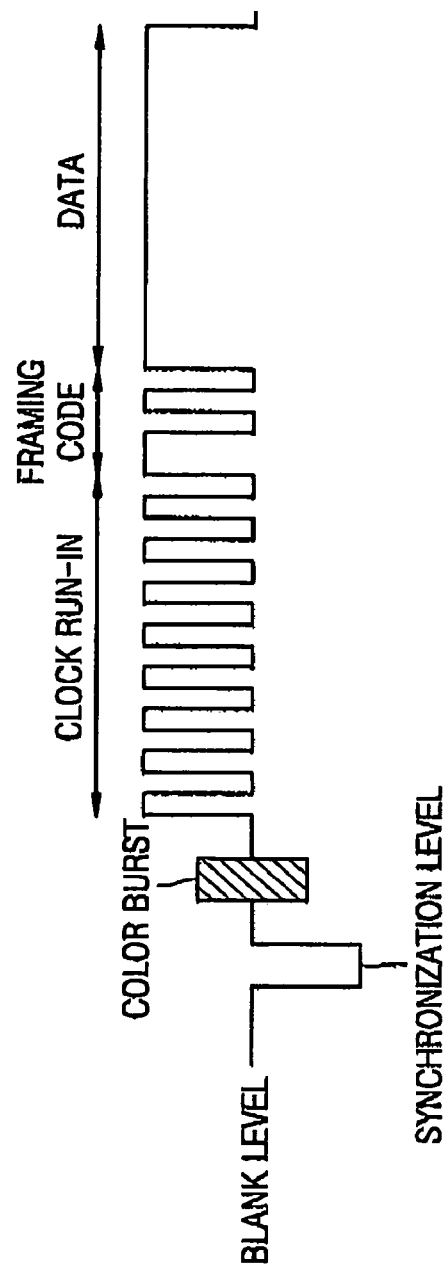
FIG. 2 illustrates a waveform diagram of the VBI signal.

The operation of the quadrature averaging unit 361 is discussed in detail below. The average calculator 15 may average sample values during a clock run-in period from the re-sample data X2RESMD and determine the averaged sample value as an average AVG of the clock run-in. As shown in FIG. 2, the clock run-in may have eight pulses. The average calculator 15 may calculate an average of sample values of the eight pulses. The four output units 11~14 may subtract the average AVG of the clock run-in from each of four sample values included in a period of the clock run-in from the re-sample data X2RESMD and output the subtracted values. The first output unit 11 may subtract the average AVG of the clock run-in from the sample value a shown in FIG. 4 and outputs value e. The second output unit 12 may subtract the average AVG of the clock run-in from the sample value b shown in FIG. 4 and outputs value f. The third output unit 13 may subtract the average AVG of the clock run-in from the sample value c shown in FIG. 4 and outputs value g. The fourth output unit 14 may subtract the average AVG of the clock run-in from the sample value d shown in FIG. 4 and outputs value h.

The operation of the phase detector 362 is now described in detail below. The region estimator 21 may determine a phase region in the period of the clock run-in and generates a phase region value REGN using at least one of values e, f, g and h output by the quadrature averaging unit 361. The region estimator 21 selects and outputs a first value K1 and a second value K2 having a phase difference $\pi/2$ among the values e, f, g and h.

Figure 11:
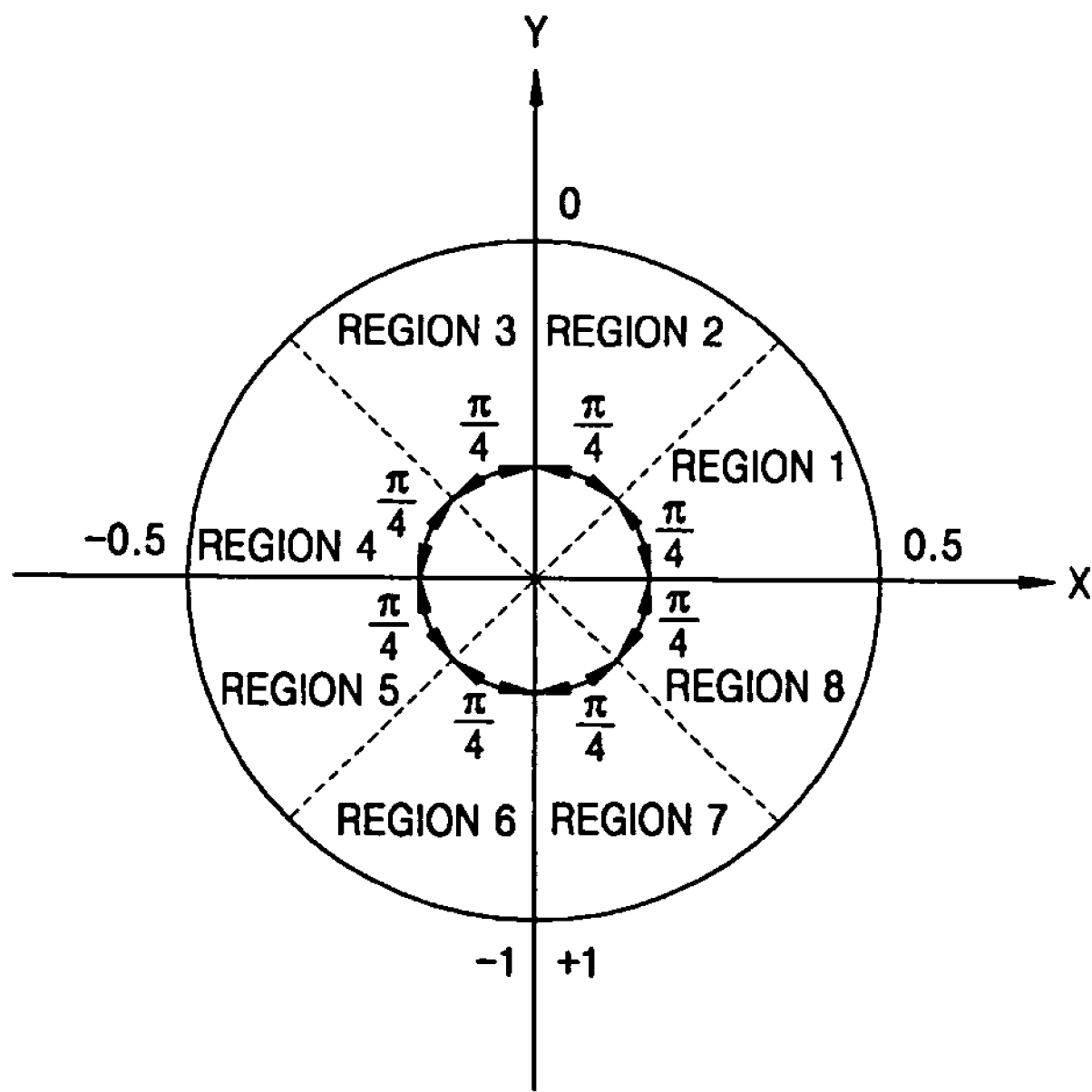
FIG. 11 illustrates eight phase regions estimated by a region estimator.

FIG. 11 illustrates eight phase regions estimated by the region estimator 21. Referring to FIG. 11, the eight phase regions may be obtained by dividing a period $2\pi$ by integer multiples of $\pi/4$. When the phase of the sample value b is in the first phase region, i.e., the sample value b has a phase error between $\pi/4$~$2\pi/4$ to the right of the reference value 0, the phase E of the clock run-in is determined to be between $\pi/4$~$2\pi/4$. The reference value 0 is determined by a distance from a synchronization level shown in FIG. 2. As such, when the sample value b is in the first through eight phase regions, the phase $\theta$ of the clock run-in in each of the eight phase regions is determined. In particular, the phase region value REGN may be information indicating one of the eight phase regions and the first value K1 and the second value K2 having the phase difference $\pi/2$ are e and f, f and g, or g and h. The eight phase regions allow the phase $\theta$ of the clock run-in to be readily determined. The phase e of the clock run-in may be determined by calculating arc tangent (atan) from the first value K1 and the second value K2 and adding integer multiples of $\pi/4$ in each of the eight phase regions.

Referring again to FIG. 10, the first divider 22 divides a lesser value of the first value K1 and the second value K2 by a greater value therebetween and outputs the divided value.

The phase calculator 23 calculates an atan value of the divided value between 0~0.5. To be more specific, the phase calculator 23 calculates the atan of a phase between 0~/2 according to the first value K1 and the second value K2 and normalizes the calculated atan value to map the calculated atan value to the value between 0~0.5.

Figure 12:
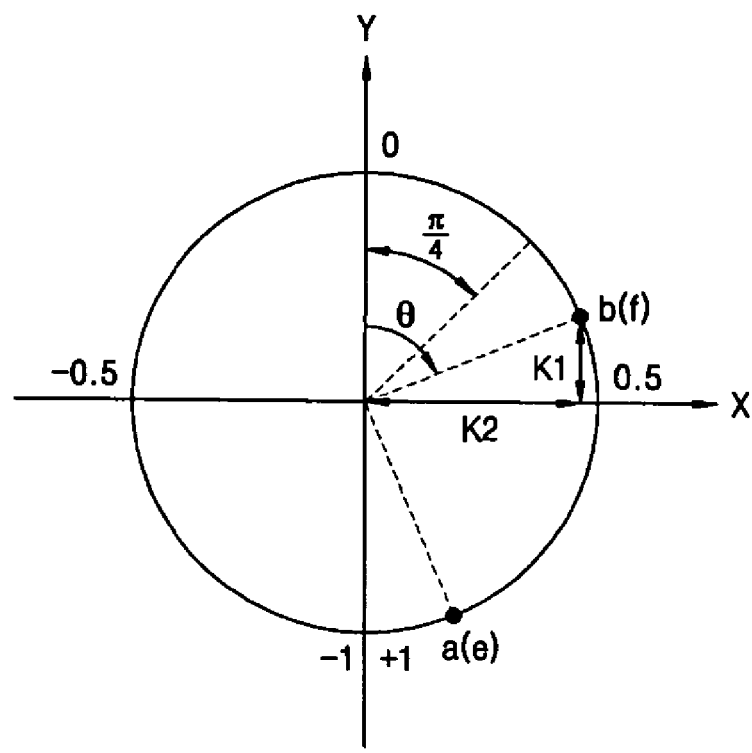
FIG. 12 illustrates calculation of the phase compensation value in a first phase region.

FIG. 12 illustrates calculation of the phase compensation value in the first phase region. Referring to FIG. 12, the double phase detector 24 subtracts the mapped value from an integer multiple value of 0.5 or adds the mapped value and the integer multiple value of 0.5 according to the phase region value REGN and generates a double phase. To be more specific, since the atan value is mapped to value between 0~0.5, the double phase detector 24 subtracts or adds a value equal to 0.5 every phase region. When the sample value b(f) has a phase between $\pi/4$~$\pi/2$ to the right of the reference value 0, i.e., is in the first phase region, as shown in FIG. 12, the double phase detector 24 adds 0.5*2 and the mapped value of atan (K1/K2).

Figure 13:
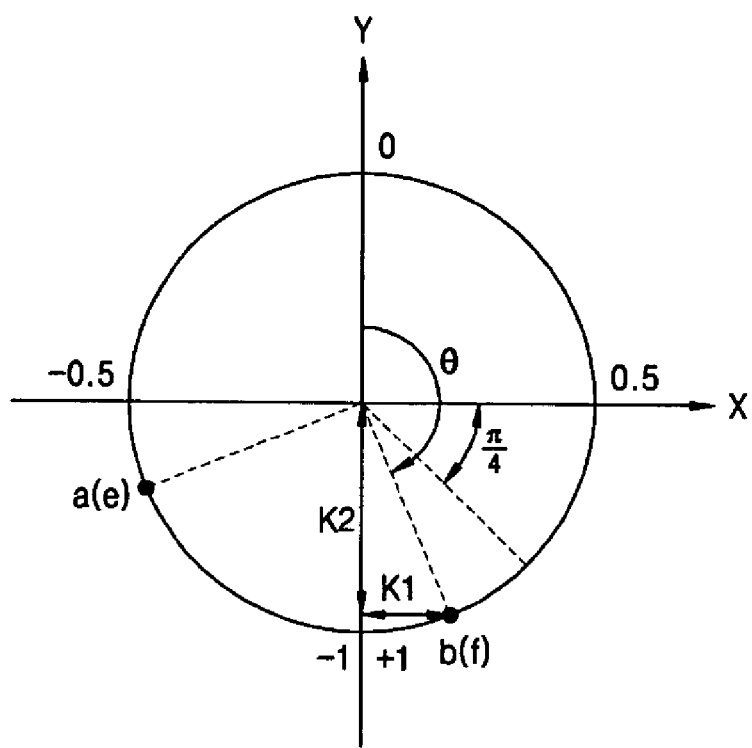
FIG. 13 illustrates calculation of the phase compensation value in a seventh phase region.

FIG. 13 illustrates calculation of the phase compensation value in the seventh phase region. Referring to FIG. 13, the double phase detector 24 adds 0.5*4 and the mapped value of atan(K1/K2), in the seventh phase region. The double phase detector 24 adds 0.5*0 and the mapped value of atan(K1/K2) in the second phase region. The double phase detector 24 subtracts the mapped value of atan(K1/K2) from −0.5*0 in the third phase region. The double phase detector 24 adds −0.5*2 and the mapped value of atan(K1/K2) in the fourth phase region. The double phase detector 24 subtracts the mapped value of atan(K1/K2) from −0.5*2 in the fifth phase region. The double phase detector 24 adds −0.5*4 and the mapped value of atan(K1/K2) in the sixth phase region. The double phase detector 24 adds 0.5*2 and the mapped value of atan(K1/K2) in the eighth phase region. To perform such calculation according to the phase region value REGN, a table value corresponding to the phase region value REGN may be stored in the double phase detector 24.

To normalize the phase value $\pi$ to 1, the second divider 25 outputs a value obtained by dividing the double phase by 2 as the phase $\theta$ of the clock run-in.

The operation of the clock run-in detector 363 is described in detail below. The first multiplier 31 may multiply e and g having the phase difference $\pi$ among the subtraction values e, f, g and h. The second multiplier 32 may multiply f and h having the phase difference $\pi$ among the subtraction values e, f, g and h. The adder 33 adds the multiplied values as given in $\sin^2 x + \cos^2 x$ of Equation 3. The summed value is at a minimum at a position different from the frequency of the clock run-in and at a maximum at the position equal to the frequency of the clock run-in.

The maximum may be detected by the comparator 34. The comparator 34 may generate a comparison signal COMP indicating whether the summed value is greater than a threshold or not. The comparison signal COMP may be in a logic high state when the summed value is greater than the threshold and a logic low state when the summed value is not greater than the threshold. The comparison signal COMP may be a signal for indicating that a currently input data includes the clock run-in, such that the re-sampler 350 or the slicer 370 cannot be operated in a horizontal scan period when the comparison signal COMP is in the logic low state.

Figure 14:
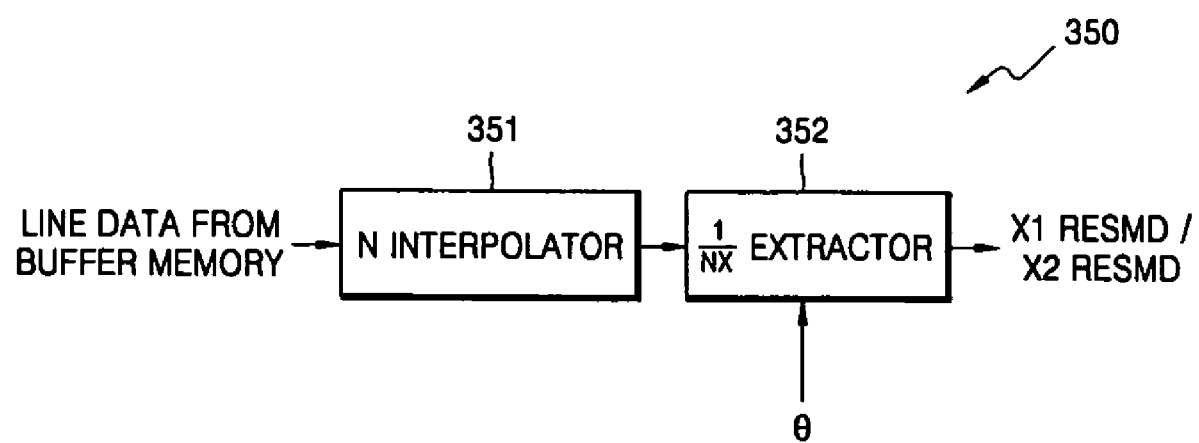
FIG. 14 illustrates a block diagram of an embodiment of the re-sampler shown in FIG. 3.

FIG. 14 illustrates a block diagram of the re-sampler 350 shown in FIG. 3. Referring to FIG. 14, to perform the polyphase filtering, the re-sampler 350 may include an interpolator 351 and a decimation unit 352. The interpolator 351 may interpolate N data between the input video sample values according to a predetermined function. The decimation unit 352 extracts and outputs the X number of data among the N data at a rate. The re-sampler 350 generates the re-sample data X1RESMD with the VBI data rate and the re-sample data X2RESMD with the data rate two times higher than the VBI data rate from the input video data of the buffer memory 320. In particular, the re-sampler 350 may determine the compensation phase from the phase θ of the clock run-in tracked by the signal tracking unit 360, re-sample the input video data with the VBI data rate according to the compensation phase and generate the re-sample data X1RESMD. The compensation phase may be determined by moving a re-sample phase position by an opposite code value of the phase θ of the clock run-in.

The slicer 370 may determine a logical value of the re-sample data X1RESMD according to the average AVG of the clock run-in. To be more specific, the slicer 370 may output VBI data in the logic high state when each sample value of the re-sample data X1RESMD is greater than the average AVG of the clock. run-in, and VBI data in the logic low state when each sample value of the re-sample data X1RESMD is smaller than the average AVG of the clock run-in.

As described above, the signal tracking unit 360 tracks the existence of the clock run-in and the phase θ of the clock run-in and calculates the average AVG of the clock run-in using the re-sample data X2RESMD of the re-sampler 350. When the clock run-in exists, the re-sampler 350 may re-sample the input video data with the VBI data rate using the compensation phase determined according to the phase a of the clock run-in and generate the re-sample data X1RESMD. The slicer 370 may determine the logical value of the re-sample data X1RESMD according to the average AVG of the clock run-in and output the determined logical value as VBI data.

The digital video signal processing apparatus 300 according to an embodiment of the present invention may use a single re-sampler, determine the existence of a clock run-in and digitally process a compensation phase using simplified hardware without the PLL, thereby reducing manufacturing expense and increasing performance of detecting VBI data.

Exemplary embodiments of the present invention have been disclosed herein, and although specific terms are employed, they are used and are to be interpreted in a generic and descriptive sense only and not for purpose of limitation. For example, while embodiments of the present invention has been described relative to a hardware implementation, the processing of present may be implemented in software, e.g., by an article of manufacture having a machine-accessible medium including data that, when accessed by a machine, cause the machine to detect VBI data in accordance with methods of the present invention. Accordingly, it will be understood by those of ordinary skill in the art that various changes in form and details may be made without departing from the spirit and scope of the present invention as set forth in the following claims.

What is claimed is:

1. A digital video signal processing method, comprising:
generating re-sample data with a data rate two times higher than a vertical blanking interval (VBI) data rate from input video data;
tracking a phase of a clock run-in from the generated re-sample data;
calculating an average of the clock run-in from the generated re-sample data;
generating re-sample data with the VBI data rate from input video data according to a compensation phase determined by the tracked phase of the clock run-in; and
determining a logical value of the re-sample data with the VBI data rate according to the average of the clock run-in and outputting the determined logical value as VBI data.

2. The method as claimed in claim 1, wherein tracking the phase of the clock run-in comprises replacing the input video data with sample values in a waveform of a trigonometric function.

3. The method as claimed in claim 1, wherein tracking the phase of the clock run-in comprises:
subtracting the average of the clock run-in from the re-sample data with the data rate two times higher than the VBI data rate and outputting the subtracted values; and
determining the phase of the clock run-in using the subtracted values.

4. The method as claimed in claim 3, further comprising:
multiplying a first value and a second value having a phase difference π among the subtracted values;
multiplying a third value and a fourth value having the phase difference π among the subtracted values;
adding the multiplied values; and
generating a comparison signal indicating whether the summed value is greater than a threshold.

5. The method as claimed in claim 4, wherein a re-sampling operation or a VBI data outputting operation in a horizontal scan period is determined according to the comparison signal.

6. The method as claimed in claim 1, further comprising:
averaging sample values during a period of the clock run-in from the re-sample data with the data rate two times higher than the VBI data rate and outputting the average as the average of the clock run-in; and
subtracting the average of the clock run-in from each of four sample values included in a period of a clock run-in pulse from the re-sample data with the data rate two times higher than the VBI data rate, and outputting the subtracted values.

7. The method as claimed in claim 6, further comprising:
determining a phase region of the period of the clock run-in pulse from the subtracted values; and
determining the phase of the clock run-in from a first value and a second value having a phase difference π/2 among the subtracted values according to the phase region.

8. The method as claimed in claim 7, further comprising:
dividing a period 2π by integral multiples of π/4 and outputting eight phase regions; and
obtaining the phase region from the eight phase regions.

9. The method as claimed in claim 6, wherein tracking of the phase of the clock run-in comprises:
generating a phase region value within a period from at least one of the subtracted values;
dividing a smaller value between the first and second values by a greater value therebetween and outputting a first divided value;
calculating an arc tangent (atan) value of the first divided value and mapping the calculated atan value to a value between 0~0.5;
combining the mapped value and an integer multiple value of 0.5 according to the phase region value and generating a double phase; and
dividing the double phase by two and outputting the divided value as the phase of the clock run-in.

10. The method as claimed in claim 1, further comprising:
storing a plurality of consecutive sample values of the digital video data; and
outputting the input video data used for a poly-phase filtering in the re-sampling operation from the stored plurality of consecutive sample values.

11. A digital video signal processing apparatus, comprising:
- a re-sampler generating first re-sample data at a vertical blanking interval (VBI) data rate from input video data and second re-sample data with a data rate two times higher than the VBI data rate from input video data;
- a signal tracking unit tracking an existence of a clock run-in and a phase of the clock run-in and calculating an average of the clock run-in from the second re-sample data; and
- a slicer determining a logical value of the first re-sample data according to the average of the clock run-in and outputting the determined logical value as VBI data,
- wherein the re-sampler determines a compensation phase from the tracked phase of the clock run-in, re-samples the input video data according to the compensation phase with the VBI data rate, and generating the first re-sample data.

12. The apparatus as claimed in claim 11, wherein the signal tracking unit tracks the phase of the clock run-in by replacing the input video data with sample values in a waveform of a trigonometric function.

13. The apparatus as claimed in claim 11, wherein the signal tracking unit comprises:
- a quadrature averaging unit calculating the average of the clock run-in from the second re-sample data, subtracting the calculated average of the clock run-in from the second re-sample data and outputting the subtracted values;
- a phase detector determining the phase of the clock run-in using the subtracted values; and
- a clock run-in detector determining a comparison signal for indicating the existence of the clock run-in using the subtracted values.

14. The apparatus as claimed in claim 13, wherein the quadrature averaging unit comprises:
- an average calculator generating an average of the sample values during a period of the clock run-in from the second re-sample data as the average of the clock run-in; and
- four output units subtracting the average of the clock run-in from each of four sample values included in a period of a clock run-in pulse from the second re-sample data and outputting the subtracted values.

15. The apparatus as claimed in claim 13, wherein the phase detector determines a phase region of the period of the clock run-in pulse from the subtracted values, and the phase of the clock run-in from a first value and a second value having a phase difference $\pi/2$ among the subtracted values according to the phase region.

16. The apparatus as claimed in claim 15, wherein the phase region is one of eight phase regions obtained by dividing a period $2\pi$ by integral multiples of $\pi/4$.

17. The apparatus as claimed in claim 15, wherein the phase detector comprises:
- a region estimator generating a phase region value within a period from at least one of the subtracted values;
- a first divider dividing a smaller value between the first and second values by a greater value therebetween and outputting a first divided value;
- a phase calculator calculating an arc tangent (atan) value of the first divided value and mapping the calculated atan value to a value between 0~0.5;
- a double phase detector combining an integer multiple value of 0.5 and the mapped value according to the phase region value and generating a double phase; and
- a second divider outputting a value obtained by dividing the double phase by two as the phase of the clock run-in.

18. The apparatus as claimed in claim 13, wherein the clock run-in detector comprises:
- a first multiplier multiplying a first value and a second value having a phase difference $\pi$ among the subtracted values;
- a second multiplier multiplying a third value and a fourth value having the phase difference $\pi$ among the subtracted values;
- an adder adding the multiplied values; and
- a comparator generating a comparison signal indicating whether the summed value is greater than a threshold.

19. The apparatus as claimed in claim 18, wherein an operation of at least one of the re-sampler and the slicer in a horizontal scan period is determined according to the comparison signal.

20. The apparatus as claimed in claim 11, further comprising:
- a buffer memory storing a plurality of consecutive sample values of the digital video data and outputting the input video data used for a poly-phase filtering in the re-sampler.

* * * * *